US007889185B2

(12) United States Patent
Blumenberg et al.

(10) Patent No.: US 7,889,185 B2
(45) Date of Patent: Feb. 15, 2011

(54) METHOD, SYSTEM, AND GRAPHICAL USER INTERFACE FOR ACTIVATING HYPERLINKS

(75) Inventors: Chris Blumenberg, San Francisco, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 886 days.

(21) Appl. No.: 11/620,646

(22) Filed: Jan. 5, 2007

(65) Prior Publication Data

US 2008/0259041 A1    Oct. 23, 2008

(51) Int. Cl.
G06F 3/041    (2006.01)
G06F 17/00    (2006.01)
G06F 3/048    (2006.01)

(52) U.S. Cl. .................. 345/173; 715/206; 715/814
(58) Field of Classification Search ......... 345/156–178; 178/18.01–18.09; 715/205–208, 788, 808–809, 715/814, 856–864; 382/115, 116, 119–126, 382/291
See application file for complete search history.

(56) References Cited

U.S. PATENT DOCUMENTS

| | | | |
|---|---|---|---|
| 5,051,736 A * | 9/1991 | Bennett et al. ............. | 345/180 |
| 5,404,458 A * | 4/1995 | Zetts ........................... | 710/73 |
| 5,910,800 A | 6/1999 | Shields et al. ............... | 345/336 |
| 6,049,326 A | 4/2000 | Beyda et al. ................ | 345/157 |
| 6,285,374 B1 * | 9/2001 | Falcon ........................ | 715/856 |
| 6,643,824 B1 * | 11/2003 | Bates et al. ................. | 715/205 |
| 6,647,534 B1 | 11/2003 | Graham ....................... | 715/526 |
| 6,683,627 B1 | 1/2004 | Ullmann et al. ............. | 345/786 |
| 6,961,912 B2 | 11/2005 | Aoki et al. .................. | 715/863 |
| 6,971,068 B2 | 11/2005 | Bates et al. ................. | 715/788 |
| 7,305,242 B2 | 12/2007 | Zakharia et al. ............. | 455/456 |
| 7,446,783 B2 * | 11/2008 | Grossman .................... | 345/660 |
| 7,614,008 B2 | 11/2009 | Ording ........................ | 715/773 |
| 2003/0063073 A1 | 4/2003 | Geaghan et al. ............. | 345/173 |
| 2003/0164861 A1 | 9/2003 | Barbanson et al. .......... | 345/815 |

(Continued)

FOREIGN PATENT DOCUMENTS

EP    1674976 A2    6/2006

(Continued)

OTHER PUBLICATIONS

"Hover Pop-up Over and Image—How?" Microsoft ASP.Net, Nov. 2006, 7 pages, http://forums.asp.net/p/1042400/1459604.aspx>.

(Continued)

*Primary Examiner*—Bipin Shalwala
*Assistant Examiner*—Keith Crawley
(74) *Attorney, Agent, or Firm*—Morgan, Lewis & Bockius LLP

(57) ABSTRACT

Methods, systems, and graphical user interfaces for activating hyperlinks are disclosed. In one embodiment, a portable electronic device: displays content on a touch screen display, wherein the content includes a plurality of links to additional content; detects a contact by a finger with the touch screen display, wherein the contact includes an area of contact; determines a point within the area of contact; determines a link in the plurality of links that satisfies two or more predetermined criteria with respect to the point, including a closest proximity criterion and a maximum proximity criterion; and activates the determined link.

23 Claims, 13 Drawing Sheets

U.S. PATENT DOCUMENTS

| | | | |
|---|---|---|---|
| 2004/0178994 A1 | 9/2004 | Kairls, Jr. | 345/173 |
| 2004/0204128 A1 | 10/2004 | Zakharia et al. | 455/566 |
| 2006/0022955 A1 | 2/2006 | Kennedy | 345/173 |
| 2006/0181519 A1 | 8/2006 | Vernier et al. | 345/173 |

FOREIGN PATENT DOCUMENTS

| | | |
|---|---|---|
| GB | 2351639 A | 1/2001 |

OTHER PUBLICATIONS

Pawson, D., "RE: Internet Access Via a Touch Screen," Feb. 4, 1998, 1 page, http://lists.w3.org/Archives/Public/w3-wai-ig/1998JanMar/0124.htm.

International Search Report and Written Opinion for International Application PCT/US2007/088875, mailed Jun. 12, 2008.

International Search Report and Written Opinion for International Application PCT/US2007/077645, mailed Jan. 10, 2008. (Related case).

JK On the Run, "New Apple Tablet Patents," Feb. 12, 2006, 8 pages, http://jkontherun.blogs.com/jkontherun/2006/02/new_apple_table.html.

Sami's Site, "Link Hover Tooltip," printed Jan. 10, 2008, 7 pages, http://www.samisite.com/test-csb2nf/id121.htm.

Time-tripper, "UI Patterns and Techniques, Rollover Effects," Time-tripper.com, printed Sep. 3, 2009, 3 pages, http://www.time-tripper.com/uipatterns/Rollover_Effects.

Office Action dated Dec. 29, 2009, received in U.S. Appl. No. 11/620,644 (related).

Buyukkokten, O. et al., "Power Browser: Efficient Web Browsing for PDAs," Digital Libraries Lab (InfoLab), Stanford University, Stanford, CA, 8 pages, 1999.

"Centroid", http://faculty, evansville.edu/ck6/tcenters/class/centroid.html, printed Apr. 28, 2006, 4 pages.

Frey, C., "First Look: Inspiration for the Pocket PC," Innovation Tools, http://www.innovationtools.com/Tools/SoftwareDetails.asp=191, printed Jun. 13, 2006, 3 pages.

Hurst, A. "Tap Tips: Lightweight Discovery of Touchscreen Targets," Xerox Palo Alto Research Center, 2 pages, 2001.

KDE News, "Got the Dot?" http://dot.kde.org/976193346/976210003/976217633/976220238/976221884, printed Jan. 10, 2008, 2 pages.

Final Office Action dated May 21, 2010, received in U.S. Appl. No. 11/620,644.

Final Office Action dated May 21, 2010, received in U.S. Appl. No. 11/620,644.

* cited by examiner

METHOD, SYSTEM, AND GRAPHICAL USER INTERFACE FOR ACTIVATING HYPERLINKS

RELATED APPLICATIONS

This application is related to U.S. patent application Ser. No. 11/620,644, filed Jan. 5, 2007, entitled "Method, System, and Graphical User Interface for Displaying Hyperlink Information," the disclosure of which is hereby incorporated by reference herein.

TECHNICAL FIELD

The disclosed embodiments relate generally to user interfaces for portable devices, and more particularly, to activating hyperlinks on a portable electronic device.

BACKGROUND

In recent years, the capabilities of portable electronic devices have expanded greatly. A feature that has become popular is web browsing via a wireless network, such as cellular networks or Wi-Fi. With this feature, users can browse websites without having to be in front of a desktop computer or having to carry around a laptop computer.

A drawback of portable devices, however, is the small screen size. The small screen size limits the amount of information and/or the size of the information that can be shown on the screen. This limitation can pose problems for web browsing on such devices because links in webpages displayed on a small screen may not be perceived easily by users. As a result, getting information about the hyperlinks and navigating to other webpages via the hyperlinks takes on a hit-or-miss character, which can frustrate users and make the web browsing experience on portable devices cumbersome.

Accordingly, there is a need for a more efficient ways to convey hyperlink information and select hyperlinks in portable devices.

SUMMARY

The above deficiencies and other problems associated with user interfaces for portable devices are reduced or eliminated by the disclosed device that includes a user interface for activating hyperlinks.

According to some embodiments, a computer-implemented method for a portable electronic device includes: displaying content on a touch screen display, wherein the content includes a plurality of links to additional content; detecting a contact by a finger with the touch screen display, wherein the contact includes an area of contact; determining a point within the area of contact; determining a link in the plurality of links that satisfies two or more predetermined criteria with respect to the point, including a closest proximity criterion and a maximum proximity criterion; and activating the determined link.

According to some embodiments, a graphical user interface on a portable electronic device with a touch screen display includes content that includes a plurality of links to additional content. In response to detection of an area of contact of a finger with the touch screen display, a point in the area of contact is determined and a link in the plurality of links is chosen and activated. The link satisfies two or more predetermined criteria with respect to the point within the area of contact. The predetermined criteria include a closest proximity criterion and a maximum proximity criterion.

According to some embodiments, a portable electronic device includes a touch screen display, one or more processors, memory; and a program. The program is stored in the memory and configured to be executed by the one or more processors. The program includes instructions for displaying content on a touch screen display, wherein the content includes a plurality of links to additional content; instructions for detecting a contact by a finger with the touch screen display, wherein the contact includes an area of contact; instructions for determining a point within the area of contact; instructions for determining a link in the plurality of links that satisfies two or more predetermined criteria with respect to the point, including a closest proximity criterion and a maximum proximity criterion; and instructions for activating the determined link.

According to some embodiments, a computer-program product includes a computer readable storage medium and a computer program mechanism embedded therein. The computer program mechanism includes instructions which, when executed by a portable electronic device with a touch screen display, cause the device to: display content on a touch screen display, wherein the content includes a plurality of links to additional content; detect a contact by a finger with the touch screen display, wherein the contact includes an area of contact; determine a point within the area of contact; determine a link in the plurality of links that satisfies two or more predetermined criteria with respect to the point, including a closest proximity criterion and a maximum proximity criterion; and activate the determined link.

According to some embodiments, a portable electronic device with a touch screen display includes means for displaying content on a touch screen display, wherein the content includes a plurality of links to additional content; means for detecting a contact by a finger with the touch screen display, wherein the contact includes an area of contact; means for determining a point within the area of contact; means for determining a link in the plurality of links that satisfies two or more predetermined criteria with respect to the point, including a closest proximity criterion and a maximum proximity criterion; and means for activating the determined link.

Thus, the invention activates hyperlinks in portable electronic devices with touch screen displays. The invention is particularly useful for devices that primarily receive finger-based input on the touch screen, rather than stylus-based input, because the large contact area of a finger may otherwise make it difficult for a user to know which hyperlink will be selected for a given finger contact.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of user interfaces and associated processes for using a portable electronic device with a touch screen are described. In some embodiments, the device is a portable communications device. The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable electronic device capable of wireless communications (e.g., a mobile or cellular telephone or a personal digital assistant with wireless networking capabilities) that includes a touch screen is used as an exemplary embodiment. It should be understood, however, that the user interfaces and associated processes may be applied to other devices, such as personal computers and laptops, which may include one or more other physical user-interface devices, such as a click wheel, a keyboard, a mouse and/or a joystick.

The device may support a variety of applications, such as one or more telephone applications, text messaging, word processing, email, web browsing, and a music player. The music player may be compatible with one or more file formats, such as MP3 and/or AAC. In an exemplary embodiment, the device includes an iPod music player (iPod is a trademark of Apple Computer, Inc.).

The various applications that may be executed on the device may use at least one common physical user-interface device, such as the touch screen. In embodiments that include a touch screen, one or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent to a user.

Figure 1:
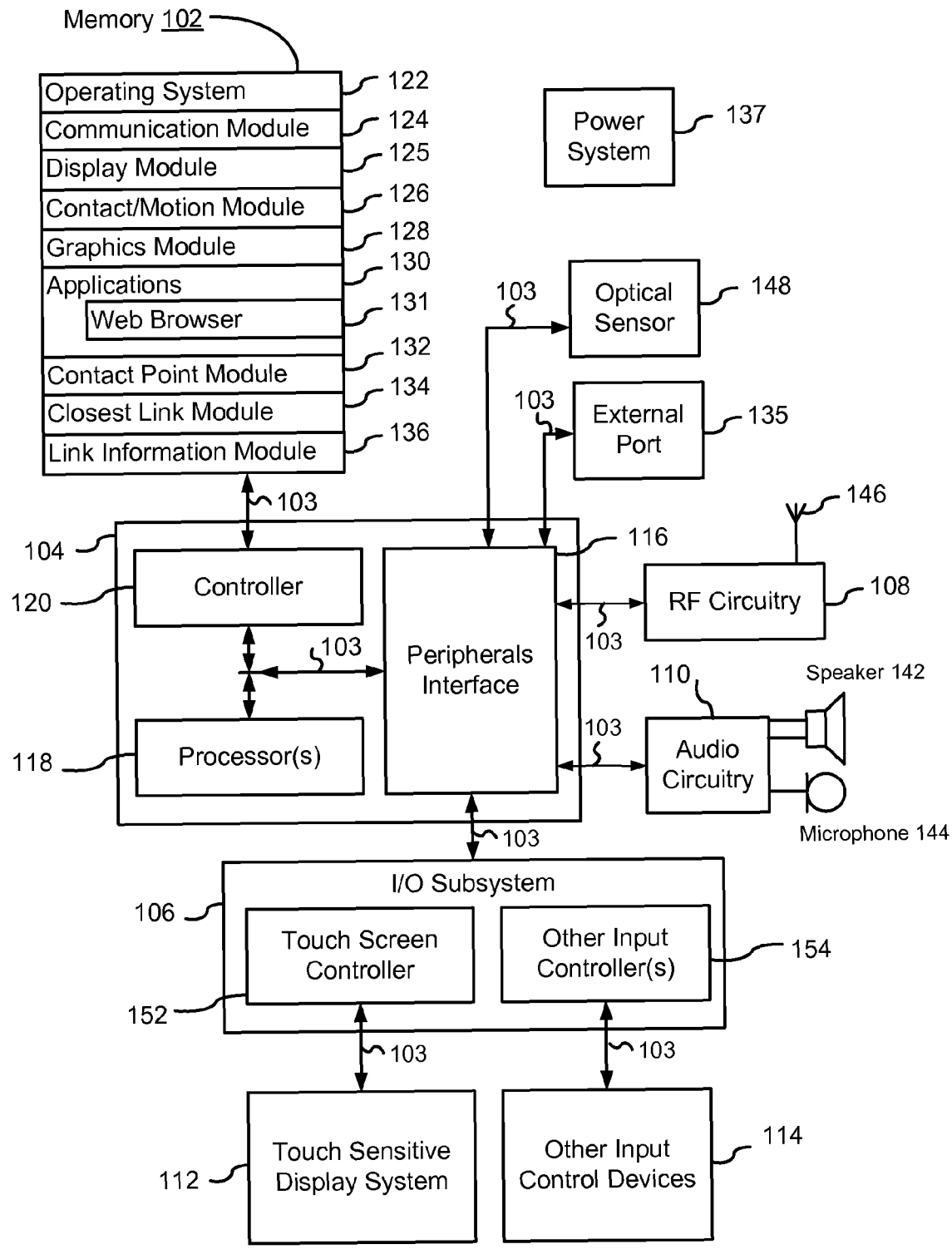
FIG. 1 is a block diagram illustrating a portable electronic device in accordance with some embodiments.

Attention is now directed to an embodiment of a portable electronic device. FIG. 1 is a block diagram illustrating an embodiment of a portable electronic device 100 having a touch-sensitive display 112. The touch-sensitive display 112 is sometimes called a "touch screen" for convenience. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in an integrated circuit 104. The various components in the device 100 may be coupled by one or more communication buses or signal lines 103.

If the device 110 includes picture taking capabilities, the peripherals interface 116 is coupled to an optical sensor 148, such as a CMOS or CCD image sensor. The peripherals interface 116 may also be coupled to RF circuitry 108; audio circuitry 110; and/or an input/output (I/O) subsystem 106. The audio circuitry 110 may be coupled to a speaker 142 and a microphone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), BLUETOOTH (BLUETOOTH is a registered trademark of Bluetooth Sig, Inc), Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a mobile phone (e.g., a cellular telephone).

The I/O subsystem 106 may include a touch screen controller 152 and/or other input controller(s) 154. The touch-screen controller 152 may be coupled to a touch-sensitive screen or touch sensitive display system 112. The touch screen 112 and touch screen controller 152 may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen 112. A touch-sensitive display in some embodiments of the display system 112 may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, a touch screen in the display system 112 displays visual output from the portable electronic device 100, whereas touch sensitive tablets do not provide visual output. The touch-sensitive screen 112 may have a display resolution in excess of 100 dpi. In an exemplary embodiment, the touch-sensitive screen 112 has a display resolution of approximately 168 dpi. The other input controller(s) 154 may be coupled to other input/control devices 114, such as one or more buttons. In some alternative embodiments, input controller(s) 154 may be coupled to any (or none) of the following: a keyboard, infrared port, USB port, and/or a pointer device such as a mouse. The one or more buttons (not shown) may include an up/down button for volume control of the speaker 142 and/or the microphone 144. The one or more buttons (not shown) may include a push button. A quick press of the push button (not shown) may disengage a lock of the touch screen 112. A longer press of the push button (not shown) may turn power to the device 100 on or off. The user may be able to customize a functionality of one or more of the buttons. The touch screen 112 may be used to implement virtual or soft buttons and/or one or more keyboards.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, the device 100 may include circuitry for supporting a location determining capability, such as that provided by the Global Positioning System (GPS). In some embodiments, the device 100 may be used to play back recorded music, such as one or more files, such as MP3 files or AAC files. In some embodiments, the device 100 may include the functionality of an MP3 player, such as an iPod (trademark of Apple Computer, Inc.). In some embodiments, the device 100 may include a multi-pin (e.g., 30-pin) connector that is compatible with the iPod.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

The memory controller 120 may be coupled to memory 102, which may include one or more types of computer readable medium. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. The memory 102 may include a display module (or a set of instructions) 125, a contact/motion module (or a set of instructions) 126 to determine one or more points of contact and/or their movement, and a graphics module (or a set of instructions) 128. The graphics module 128 may support widgets, that is, modules or applications with embedded graphics. The widgets may be implemented using JavaScript, HTML, Adobe Flash, or other suitable computer program languages and technologies.

The memory 102 may also include one or more applications 130. Examples of applications that may be stored in memory 102 include telephone applications, email applications, text messaging or instant messaging applications, memo pad applications, address books or contact lists, calendars, picture taking and management applications, and music playing and management applications. The applications 130 may include a web browser 131 for rendering pages written in the Hypertext Markup Language (HTML), Wireless Markup Language (WML), or other languages suitable for composing webpages or other online content.

The applications 130, including the web browser 131, may render content that includes one or more hyperlinks (or "links") that link to other content. A hyperlink to an item of content is associated with the Universal Resource Locator (URL) of the item of content. Hyperlinks may be included in a wide variety of documents, including but not limited to webpages, email messages, text messages, text documents, and so forth. A hyperlink may be associated with anchor text or an anchor image in a document.

Also included in the memory 102 are a contact point module (or a set of instructions) 132, a closest link module (or a set of instructions) 134, and a link information module (or a set of instructions) 136. The contact point module 132 determines the centroid or some other reference point in a contact area formed by contact on the touch screen 112. The closest link module 134 determines a link that satisfies one or more predefined criteria with respect to a point in a contact area as determined by the contact point module 132. The link information module 136 retrieves and displays information associated with hyperlinks.

Each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
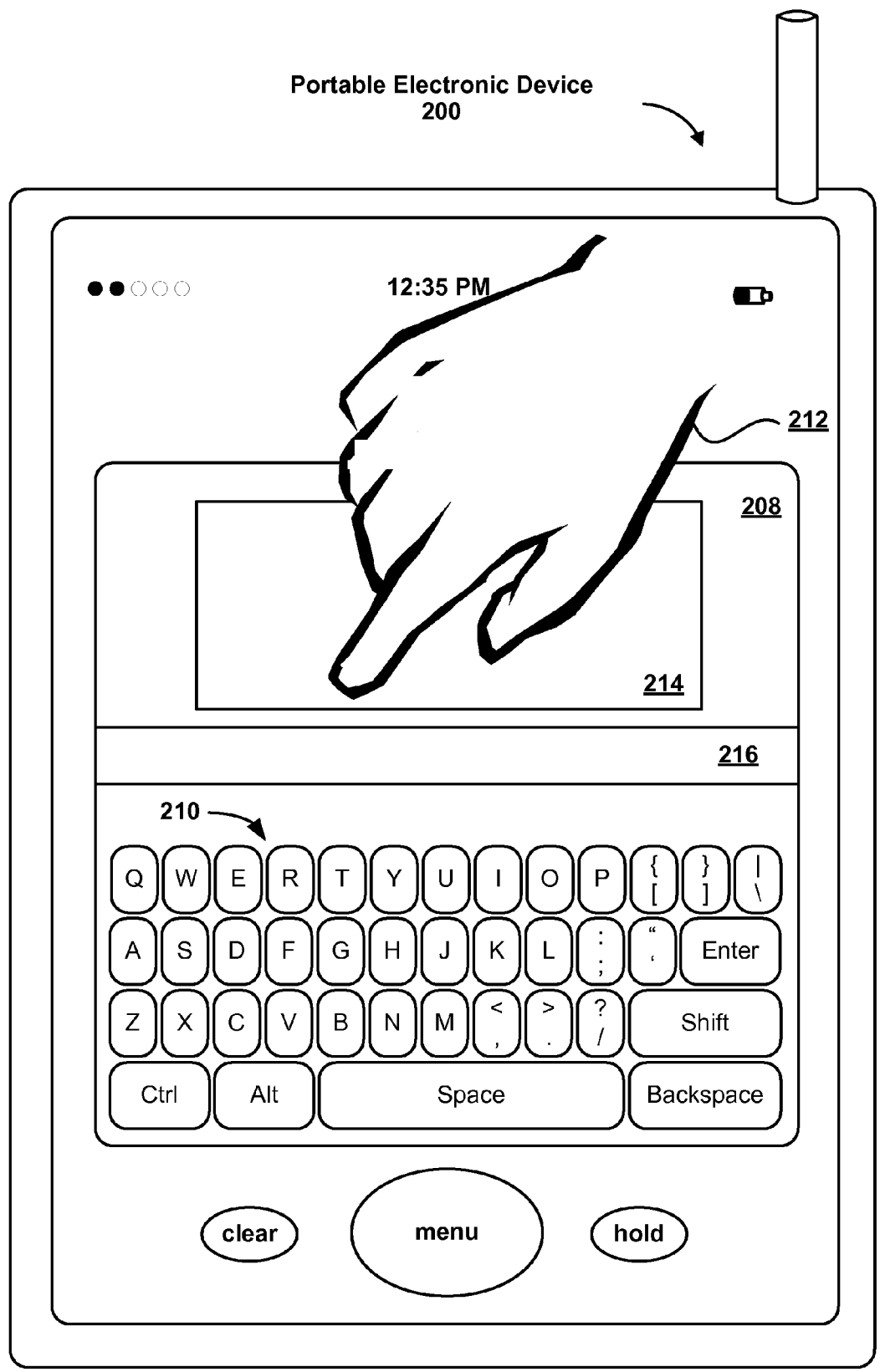
FIG. 2 illustrates a portable electronic device having a touch screen and a soft keyboard in accordance with some embodiments.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. For some applications, the touch screen may display one or more trays. A tray is a defined region or area within a graphical user interface. One tray may include a user entry interface, such as a keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of one or more icons occurs when the user breaks contact with the one or more icons. In some embodiments, the contact may include a gesture, such as one or more taps, one or more swipes (e.g., from left to right, right to left, upward and/or downward) and/or a rolling of a finger (e.g., from right to left, left to right, upward and/or downward) that has made contact with the device 200. In some embodiments, inadvertent contact with an icon may not select a corresponding symbol. For example, a swipe gesture that sweeps over an icon may not select a corresponding symbol if the gesture corresponding to selection is a tap gesture.

The device 200 may include a display tray 214, which is displayed on the touch screen 208. The display tray 214 may display one or more of the characters and/or symbols that are selected by the user. The device 200 may also include one or more physical buttons, such as the clear, hold and menu buttons shown in FIG. 2. The menu button may be used to navigate to any application in a set of applications that may be executed on the device 200. Alternatively, in some embodiments, the clear, hold, and/or menu buttons are implemented as soft keys in a GUI in touch screen 208.

Figure 3:
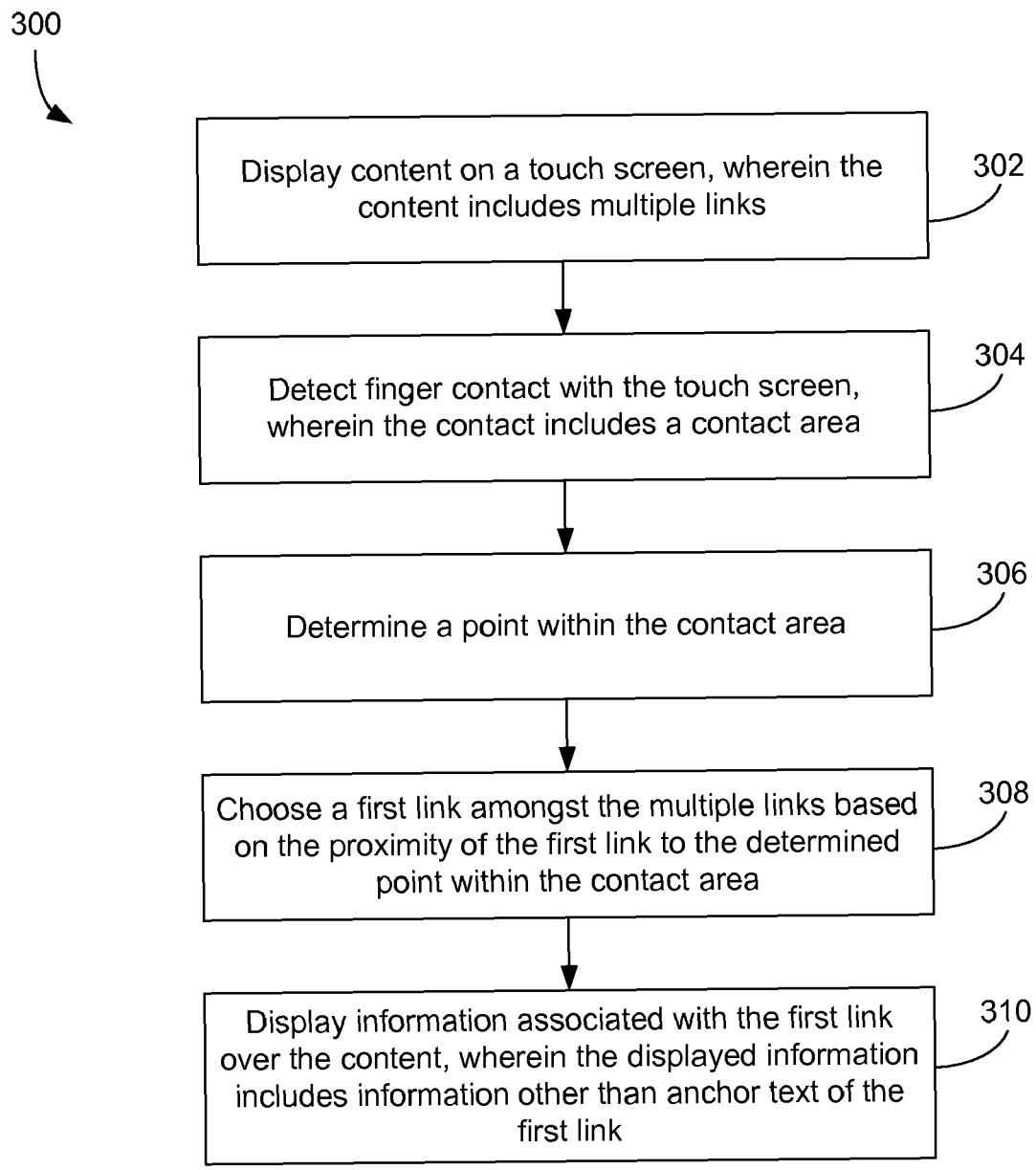
FIG. 3 is a flow diagram illustrating a process for displaying information associated with a link in accordance with some embodiments.

Attention is now directed to FIG. 3, which illustrates a process flow 300 for displaying information associated with a link in accordance with some embodiments. Content is displayed on a touch screen of a device (302). The content includes a plurality of links, which may be clustered together or scattered throughout the content. In some embodiments, the content is a webpage, which may be rendered in a web browser application 131 in the device. In some other embodiments, the content may be an email, text message, or some other document, rendered in an application 130, that includes one or more links.

A contact with the touch screen is detected, wherein the contact includes a contact area (304). In some embodiments, the contact is detected by contact/motion module 126, in conjunction with the touch-sensitive display system 112 and the touch screen controller 152. The contact may be made by a finger. The contact forms a contact area on the touch screen.

A point within the contact area is determined (306). In some embodiments, the point is determined by a contact point module 132 in conjunction with the touch-sensitive display system 112, the touch screen controller 152, and/or the processor(s) 118. The determined point serves as a reference point for the contact area. In some embodiments, the determined point is the centroid of the contact area. In some other embodiments, the determined point is a point determined in accordance with a predefined procedure. For example, in a particular embodiment, the determined point is determined by determining the center of an imaginary rectangular box that bounds the contact area. However, in some embodiments, the determined point is a point other than the box center or centroid, and is determined in accordance with one or more factors, such as the shape of the contact area (which may be indicative of which finger of the user is making contact with the touch screen), and the location of the contact (e.g., which region of the touch screen). One or more of these factors may be used by contact point module 132 to determine an "intended point of contact" that is displaced from the box center or centroid.

A link from the plurality of links is chosen (308), e.g., by a closest link module 134 in conjunction with the processor(s) 112. The link is chosen based on at least the proximity to the point in the contact area determined in block 306 above. The link that is chosen is the one that is the closest to the determined point. In some embodiments, the links from which a link is chosen is limited to those whose display area (e.g., anchor text, anchor image) overlap completely or partially with the contact area.

Information associated with the chosen link is displayed (310). In some embodiments, the link information is displayed by the link information module 136 in conjunction with the touch screen 208. The displayed information includes information other than the anchor text of the link. For example, the displayed information may include the URL of the webpage or document to which the link links, the title of the webpage or document to which the link links. Optionally, the displayed information also includes a snippet of the content in the webpage or document to which the link links, and/or a summary of the content of the webpage or document to which the link links. In some embodiments, the displayed information does not include the anchor text of the link. In other embodiments, the displayed information does include the anchor text of the link. The information may be displayed over the content, e.g., as an opaque or semi-transparent overlay.

Figure 4:
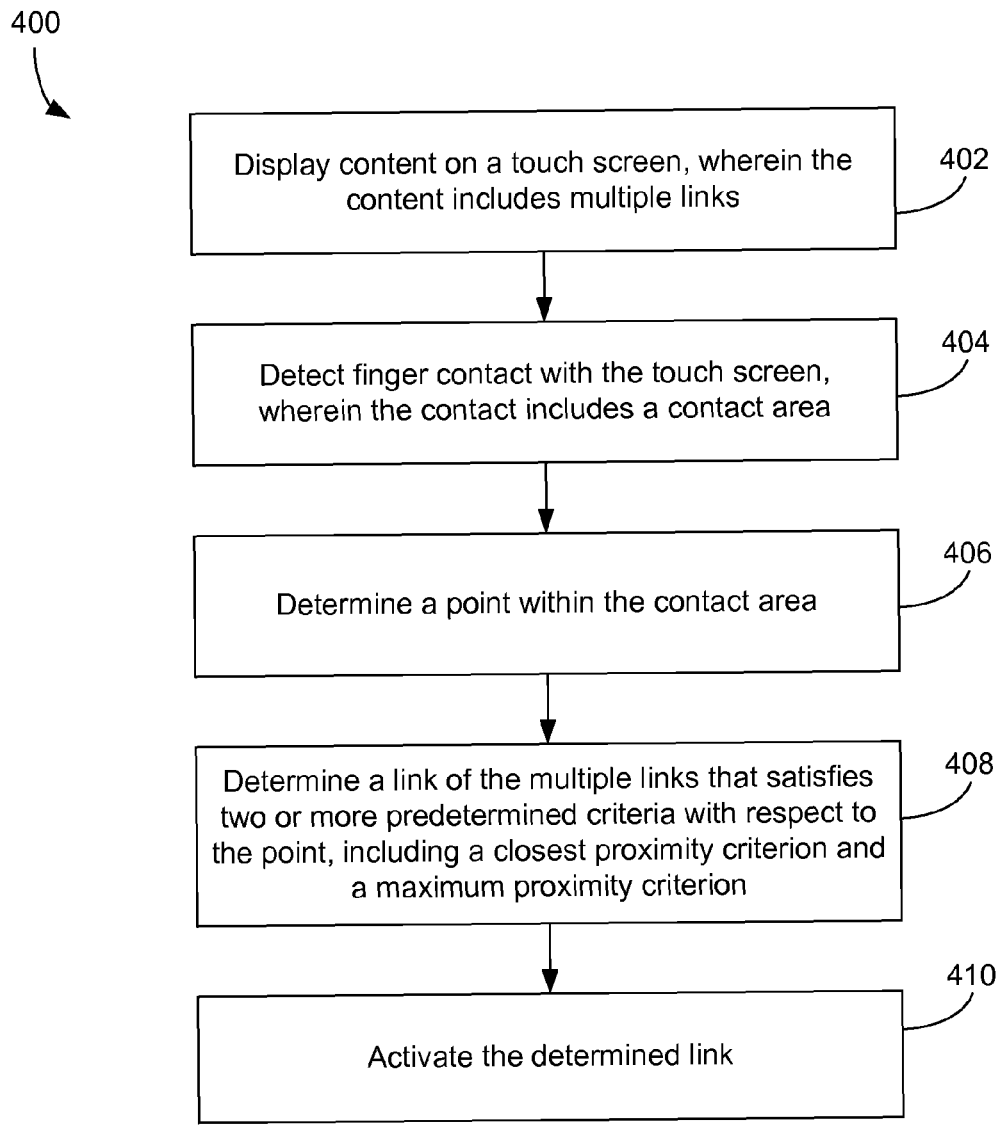
FIG. 4 is a flow diagram illustrating a process for activating a link in accordance with some embodiments.

Attention is now directed to FIG. 4, which illustrates a process flow 400 for activating a link in accordance with some embodiments. Content is displayed on a touch screen 208 of a device (402). The content includes a plurality of links, which may be clustered together or scattered throughout the content. In some embodiments, the content is a webpage, which may be rendered in a web browser application 131 in the device. In some other embodiments, the content may be an email, text message, or some other document, rendered in an application 130, that includes one or more links A contact with the touch screen is detected, wherein the contact includes a contact area (404). In some embodiments, the contact is detected by contact/motion module 126, in conjunction with the touch-sensitive display system 112 and the touch screen controller 152. The contact may be made by a finger. The contact forms a contact area on the touch screen.

A point within the contact area is determined (406). In some embodiments, the point is determined by a contact point module 132 in conjunction with the touch-sensitive display system 112, the touch screen controller 152, and/or the processor(s) 118. The determined point serves as a reference point for the contact area. In some embodiments, the determined point is the centroid of the contact area. In some other embodiments, the determined point is a point determined in accordance with a predefined procedure. For example, in a particular embodiment, the determined point is determined by determining the center of an imaginary rectangular box that bounds the contact area. As noted above, in some embodiments, the determined point is a point other than the box center or centroid, and is determined in accordance with one or more factors, such as the shape of the contact area (which may be indicative of which finger of the user is making contact with the touch screen), and the location of the contact (e.g., which region of the touch screen). One or more of these factors may be used by contact point module 132 to determine an "intended point of contact" that is displaced from the box center or centroid.

A link from the plurality of links that satisfies two or more predetermined criteria with respect to the determined point is determined (408), e.g., by a closest link module 134 in conjunction with the processor(s) 112. The two or more criteria include a closest proximity criterion and a maximum proximity criterion. That is, a link that is within a specified maximum distance from the point and is the closest to the point is determined. In some embodiments, the determined link must also overlap at least partially with the contact area. The determined link is activated (410). That is, the device navigates to the page to which the determined link points and the contents of the linked page are displayed on the device.

Attention is now directed to FIGS. 5A-5I, which illustrate a user interface for displaying information associated with links and activating links in accordance with some embodiments. A portable electronic device 200 with a touch-sensitive display 208 (also known as a touch screen) may display a webpage or some other document 502 on the touch screen. The webpage 502 may include one or more links 504. The links may be clustered all together within the webpage 502 or distributed throughout the webpage 502.

Figure 5A:
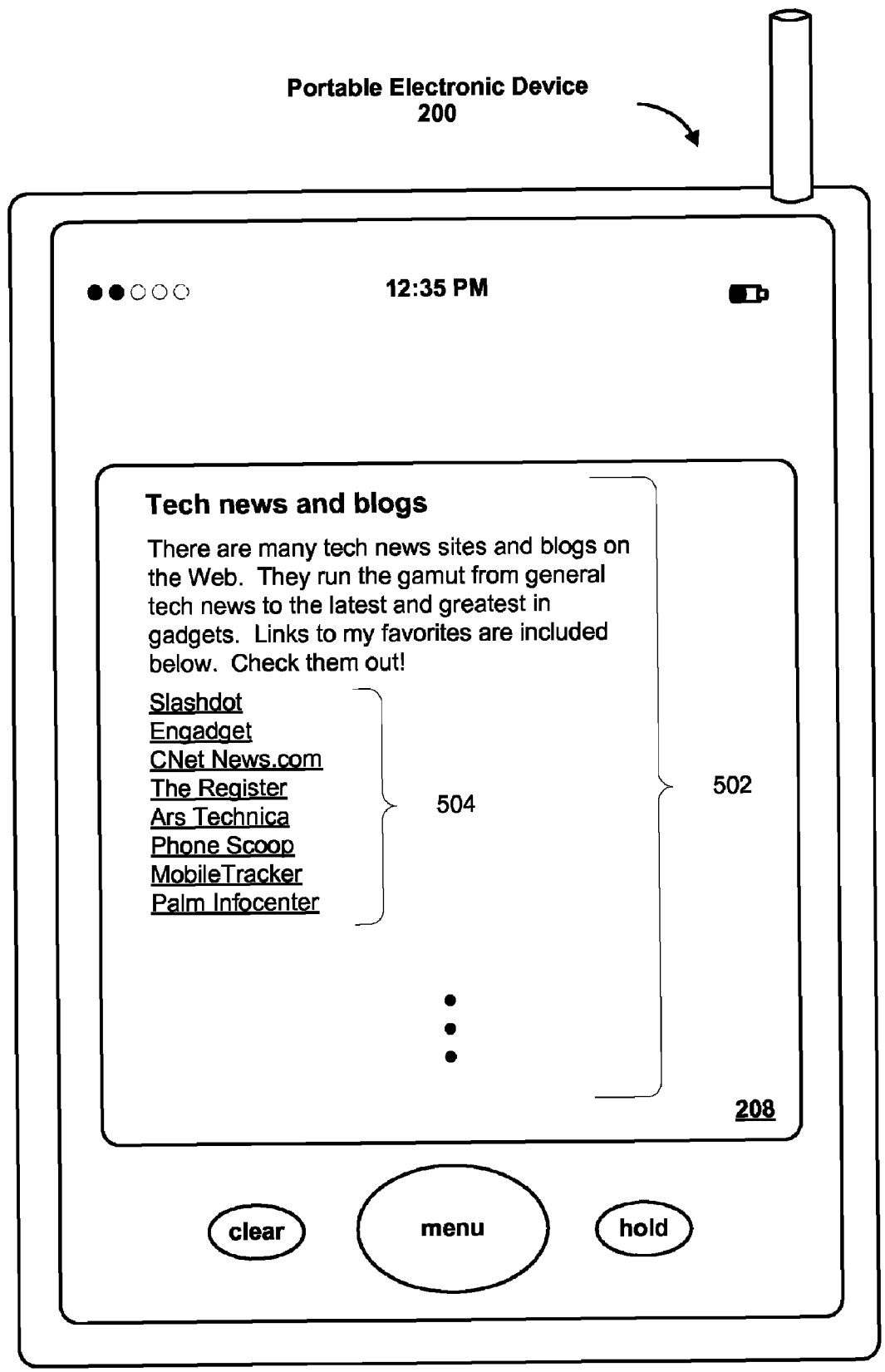
FIGS. 5A-5I illustrate a user interface for displaying information associated with links and activating links in accordance with some embodiments.
Figure 5B:
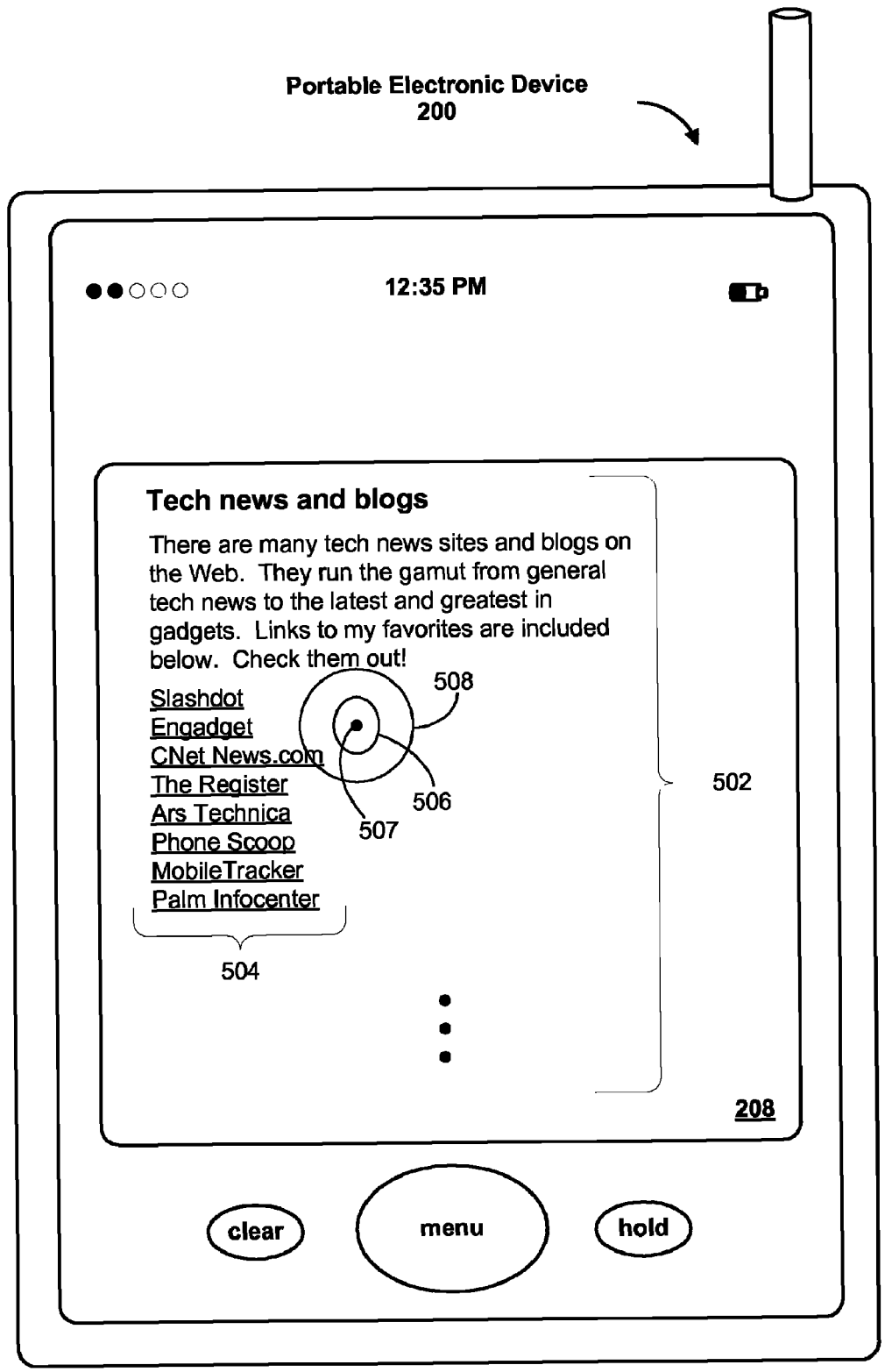

When the user makes contact with the touch screen 208 with a finger 212 (not shown), a contact area 506 on the touch screen 208 is made (FIG. 5B). A point 507 within the contact area 506 is determined, e.g., by a contact point module 132 in conjunction with the touch-sensitive display system 112, the touch screen controller 152, and/or the processor(s) 118. In some embodiments, the point 507 is the centroid of the contact area 506. However, the contact area 506 does not necessarily remain constant throughout the duration of the contact. The contact area 506 may change shape and thus the centroid or other determined point of the contact area may shift. To account for this, in some embodiments, the centroid may be re-determined at predefined intervals. More generally, the point 507 may be re-determined to account for changes in the contact area 506 and/or repositioning of the contact area 506 (for example, by movement of the finger 212).

When the user makes contact with the touch screen 208, the device 200 determines a link amongst the links 504 that satisfies a number of predefined criteria with respect to the contact area 506 and/or the point 507. In some embodiments, the determination is made by the closest link module 134 in conjunction with the processor(s) 112. The link that is determined satisfies at least a closest link criterion; the determined link is the closest one to the point 507. In some embodiments, the link that is determined also satisfies one or more of the following criteria: being within a maximum distance 508 from the point 507, partially overlapping the contact area 506, and located completely within the contact area 506. For purposes of activation of a link, the link that is determined for activation satisfies at least both the closest link criterion and the maximum distance criterion. More particularly, the display area (e.g., the anchor text, anchor image, etc.) of the determined link satisfies the criteria described above. It should be appreciated, however, that additional criteria may be used.

Figure 5C:
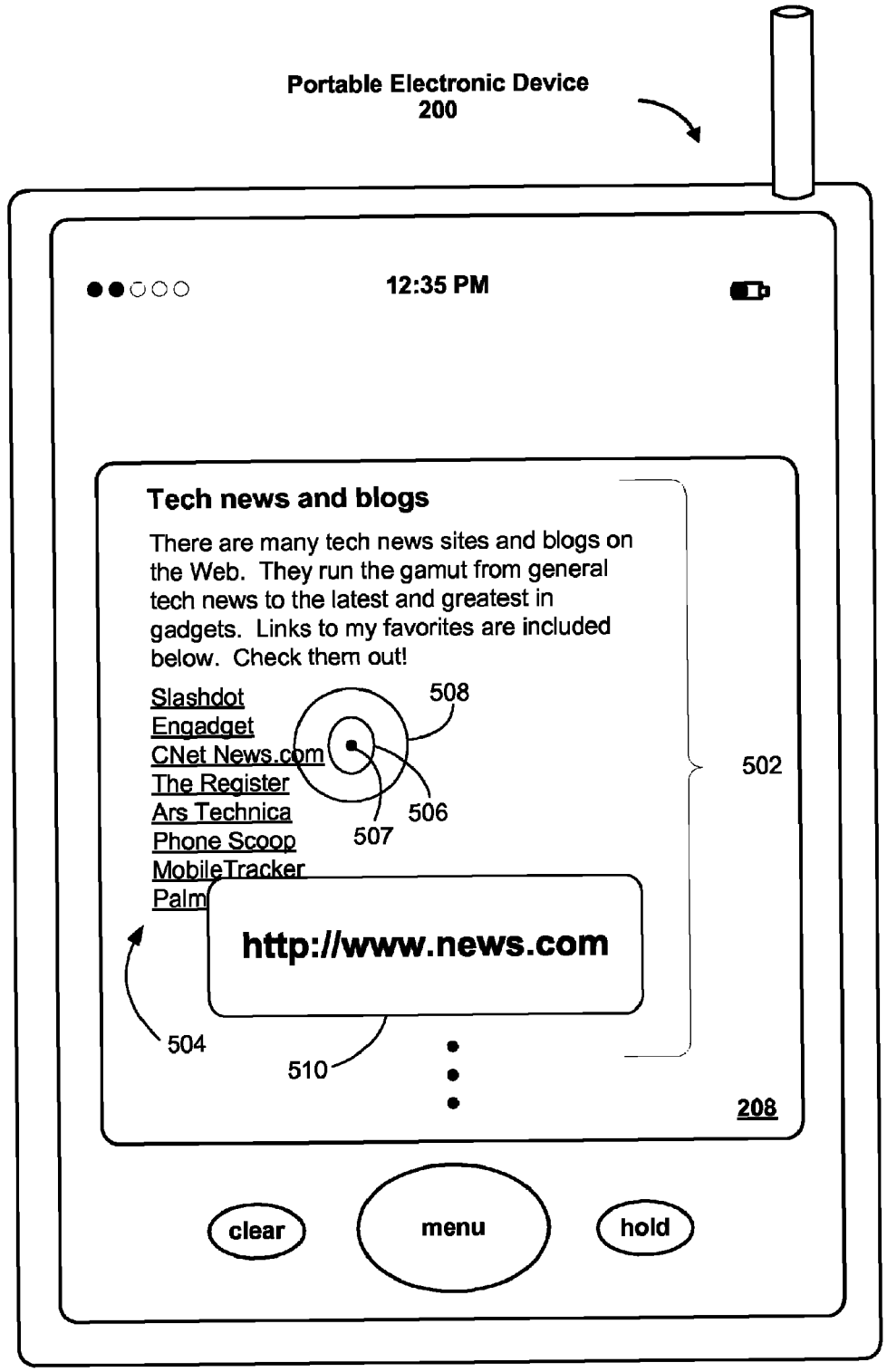
Figure 5D:
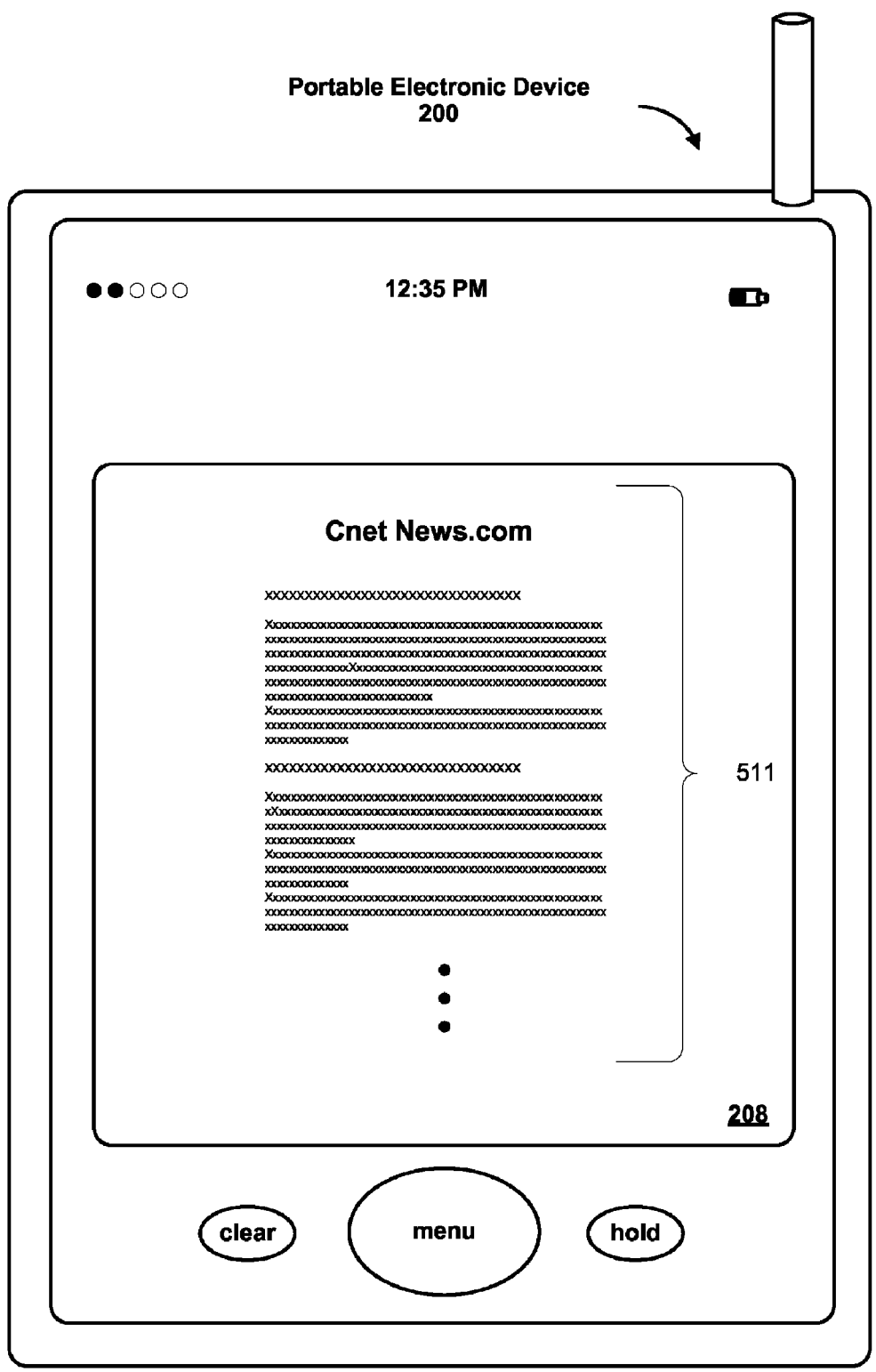
Figure 5E:
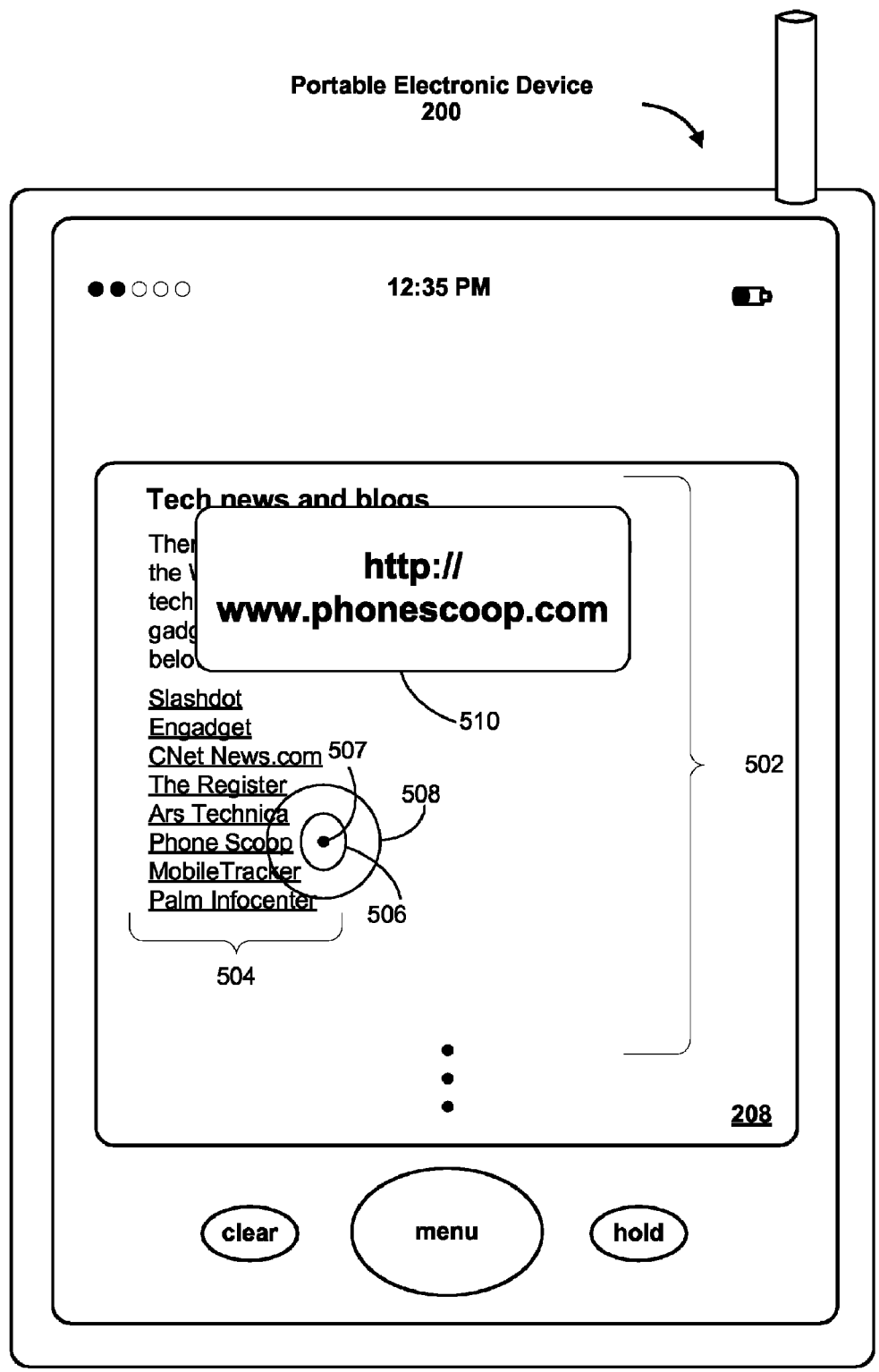
Figure 5F:
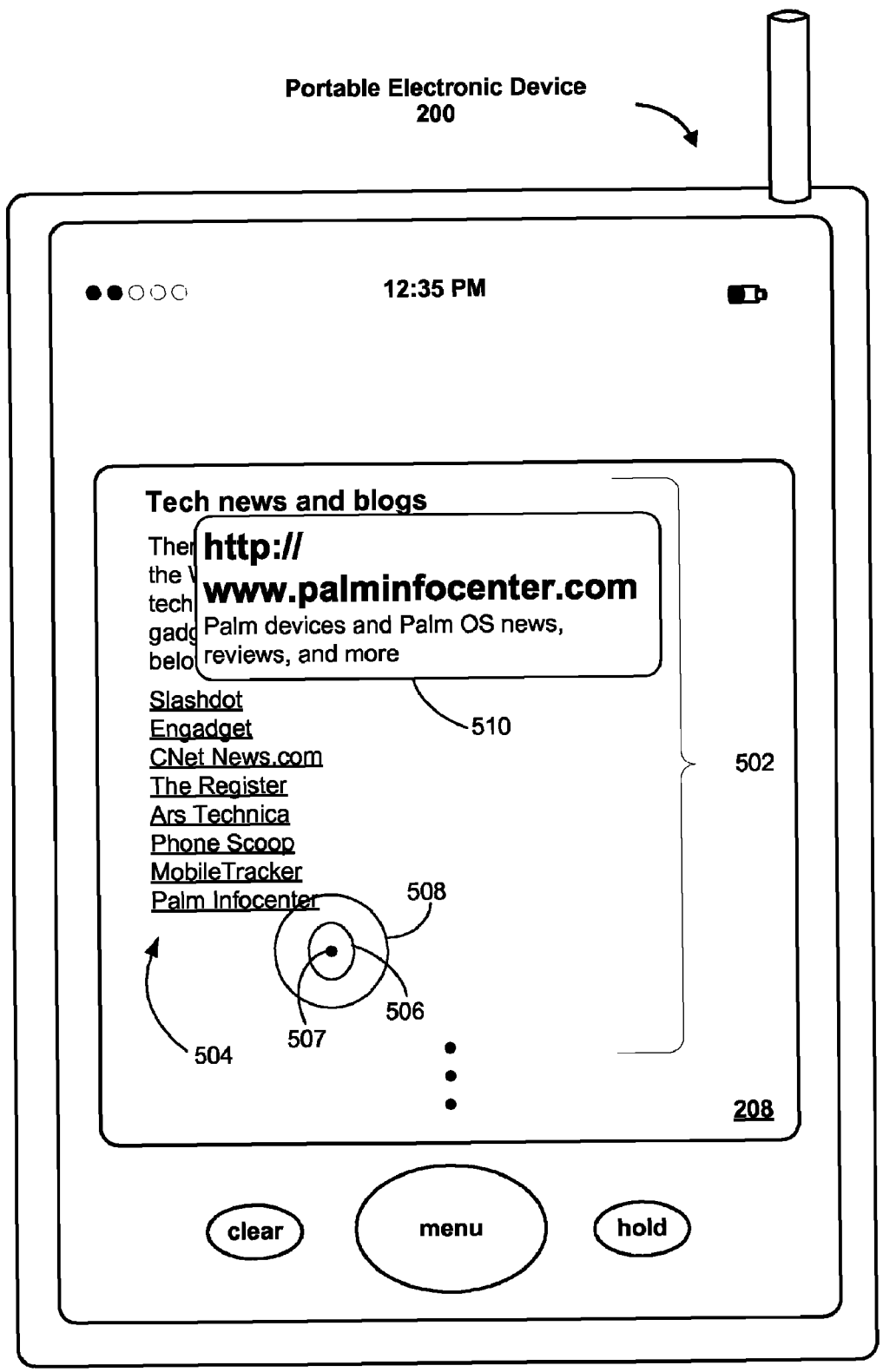

Information associated with the link that is closest to the point 507 may be displayed on the touch screen 208. In some embodiments, the link for which associated information is displayed must also be within a maximum distance 508 from the point 507. In FIG. 5C, the closest link to the point 507 is the link having the anchor text "CNet News.com." Information 510 associated with the link "CNet News.com." is displayed. In some embodiments, the displayed information 510 includes the Uniform Resource Locator (URL) of the link, a snippet of content from the page to which the link points, and/or a summary of the content from the page to which the link points (an example of which is shown in FIG. 5F). The anchor text of the link may be included or omitted in the displayed information 510.

In some embodiments, the information is displayed after the contact is maintained for at least a predetermined time (e.g., 0.2 seconds, or another value between 0.1 and 0.25 seconds) for displaying the link information. In some embodiments, the information is removed from display if the contact area 506 is not moved for longer than a predefined amount of time. For example, returning to FIG. 5C, the information 510 may be removed after a predetermined amount of time (e.g., three to five seconds) if the contact area 506 is maintained in the position as illustrated.

If the determined link is within the maximum distance 508 from the point 507, in addition to having the shortest distance from the point 507, the link may be activated. That is, the device 200 navigates to the page 511 to which the determined link points (FIG. 5D). In some embodiments, the display area of the determined link must also at least partially overlap with the contact area 506 in order to be activated.

The activation of the link may be triggered in a variety of ways. In some embodiments, the activation is triggered by breaking the contact. For particular embodiments, the activation may be triggered after the breaking of contact before or after a first predetermined amount of time has elapsed. In some other embodiments, the activation of the link may be triggered by a gesture, such as a quick tap on the touch screen 208 after breaking contact. Furthermore, in some embodiments, if the contact is held for longer than a second predetermined amount of time, whatever link information that is displayed is removed from display and the link is not activated. In some embodiments, a combination of such activation criteria are used: the selected link is activated by a contact break if the link information was displayed less than the first predetermined amount of time, and if the link information was displayed for more than that amount of time, then the user must break contact and tap the link information (which is continued to be displayed after the contact break) to activate the selected link.

The user may move the finger 212 along the touch screen 208 while still maintaining contact. This may be called "brushing" or "scrubbing" the displayed document, or "brushing" or "scrubbing" the screen. As the finger 212 moves, so do the contact area 506 and the point 507. Thus, the link that satisfies the one or more criteria with respect to the point 507 and the contact area 506 may change. In FIG. 5E, the contact area 506 and the point 507 have moved downward. The link "Phone Scoop" becomes the link that satisfies the shortest distance criterion. Thus, the information associated with the link "CNet News.com" is no longer displayed and information 510 associated with the link "Phone Scoop," such as its URL, is displayed. As the contact area 506 moves even further down, as shown in FIG. 5F, other links, such as the link "Palm Infocenter," becomes the link that satisfies the closest point criterion with respect to the point 507. The information associated with the previous determined link is no longer displayed and information associated with the link "Palm Infocenter" is displayed. Similarly, if the user moves the finger 212 upward, other links may satisfy the criterion or criteria and information associated with these links may be displayed. More generally, as the contact area 506 is moved, links that satisfy the criteria may be determined and information associated with these links may be displayed one at a time and in succession.

Information associated with links may be displayed whether the document is at normal size, zoomed in, or zoomed out. Even if the document is zoomed out such that the effective font size of the text in the document is relatively small, such as 10 point or smaller, the information 510 associated with a respective link is displayed at a legible size, such as 14 point or larger (e.g., the URL may be displayed using 14 point text and the title or the webpage pointed to by the URL may be displayed using 18 point text), which enables easy reading of the link information 510 by ordinary users. Furthermore, the font size used for displaying the link information 510 is independent of the font size, zoom factor or scale factor of the document or other content displayed by the device 200.

In some embodiments, the link information 510 is displayed on the half of the touch screen 208 that is opposite the half of the touch screen 208 where the contact area 506 is located. For example, as shown in FIGS. 5C and 5E-5F, the link information 510 is displayed on the top half of the touch screen 208 if the contact area 506 is located on the bottom half, and vice versa (see FIG. 5G). More generally, the link information 510 may be displayed away from the contact area 506 so that the user's finger 212 does not obstruct the user's view of the link information 510.

In some embodiments, a zoom or scale factor may be associated with the content that is displayed by the device

Figure 5G:
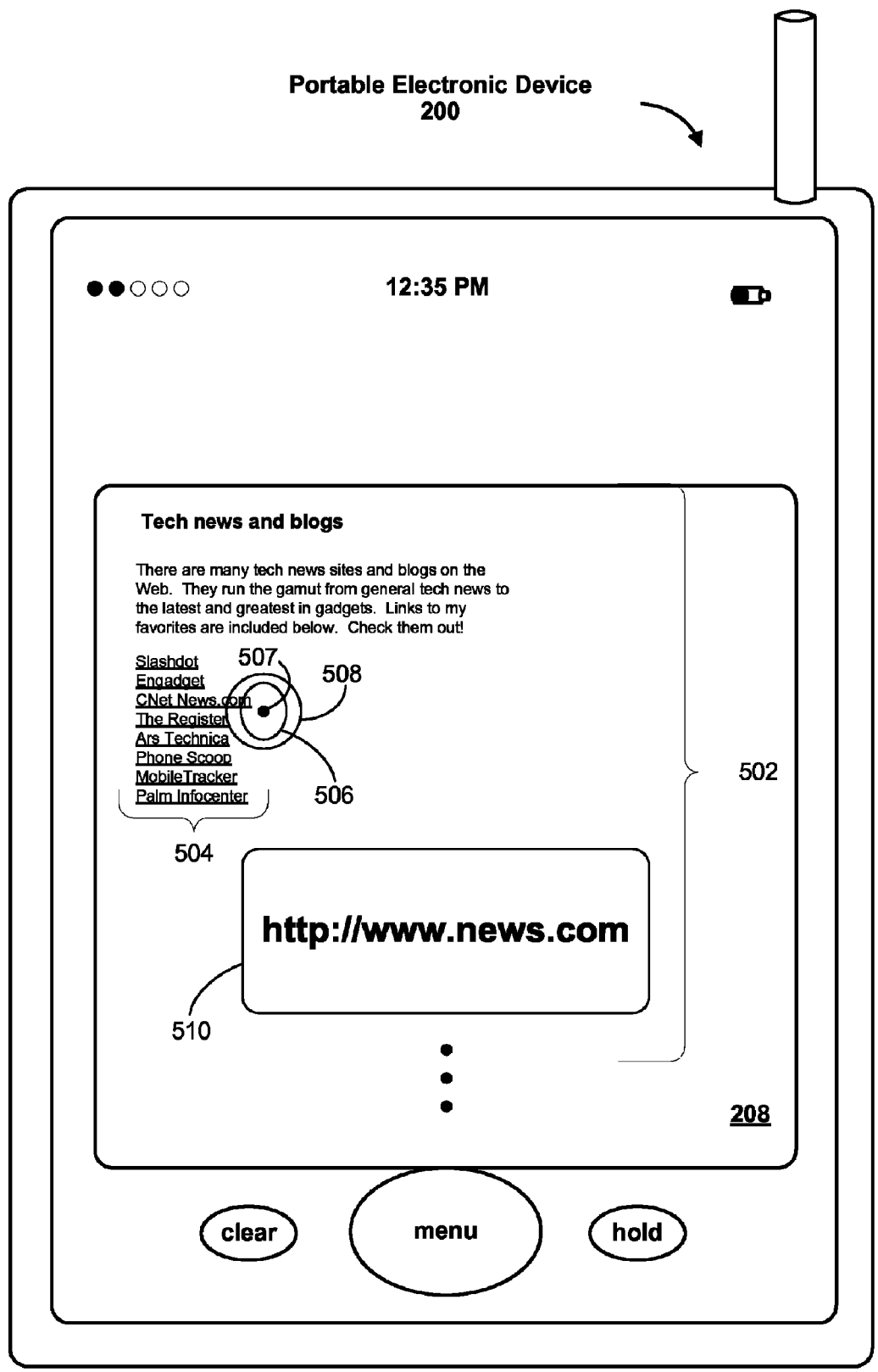
Figure 5H:
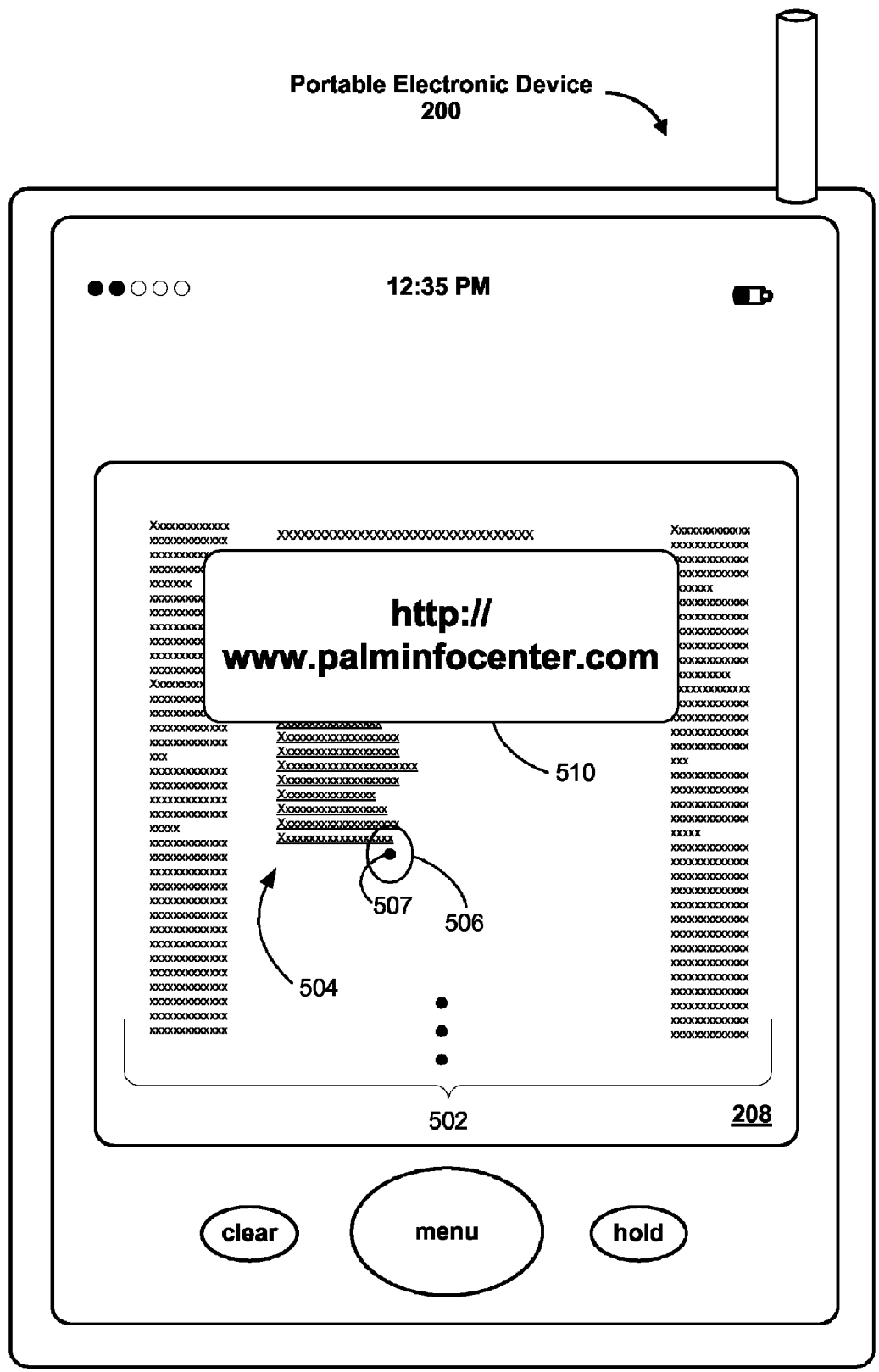

200. For example, the device may display a document at 100% zoom ("normal" size) and then zoom in (e.g., 150%, 200%, etc.) or out (e.g., 75%, 50%, etc.). In some embodiments, the maximum distance 508 is adjusted in proportion with the zoom factor. For example, if the maximum distance at 100% zoom is X, then the maximum distance at 50% zoom is X*0.5. More generally, in some embodiments, the maximum distance may be defined in terms of the coordinates of the content or document. This means that the maximum distance changes in terms of absolute distance but remains constant in terms of relative distance amongst the content in the document 502. As shown in FIGS. 5G-5H, the zoomed-out document 502 results in a smaller maximum distance 508. As the document 502 is zoomed out even further, the maximum distance 508 may be located entirely within the contact area 507, making the maximum distance 508 moot. In this case, the boundary of the contact area 506 may be used as a proxy for the maximum distance. In some other embodiments, the maximum distance may be defined in terms of the coordinates of the touch screen; the maximum distance is a constant in terms of absolute distance.

Figure 5I:
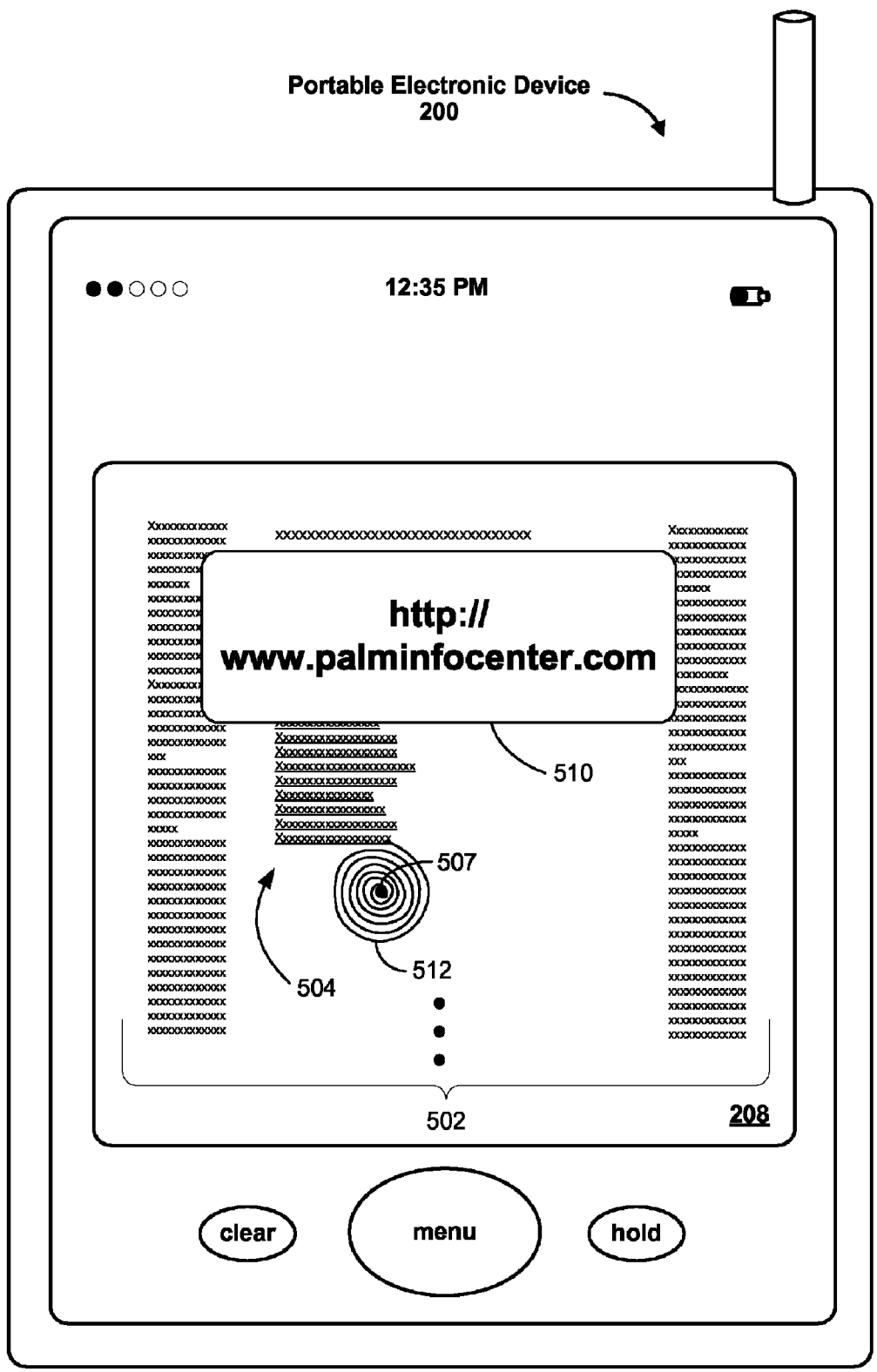

In some embodiments, a link may be chosen based on a spiraling path from the point 507. As shown in FIG. 5I, a spiral 512 may be generated out from the point 507. The link whose display area first intersects the spiral is the link that is chosen and for which associated information is displayed. In some embodiments, the spiral path is implemented as an actual spiral, while in other embodiments the spiral path is implemented as a sequence of concentric circles of increasing radius. When implemented as an actual spiral, the spiral path may be clockwise or counter-clockwise. The size and rate of the spiral may be defined in terms of the coordinates of the content and may scale in accordance with the zoom factor of the document, similar to the maximum distance 508 described above. In some embodiments, if the radius of the spiral 512 reaches a predetermined radius (which may also be scaled in accordance with the zoom factor of the content), such as the maximum distance 508, and no link intersects the spiral 512, no link is chosen for the displaying of information or for activation. The spiraling path may be treated as proxies for the closest distance criterion and the maximum distance criterion: the link that intersects the spiral first is considered to be the closest to the point 507 and the predetermined radius serves as the maximum distance.

Using the interface described above, a user may more easily view information associated with hyperlinks and activate hyperlinks on a portable device using a finger contact on a touch screen to select a hyperlink. The user is relieved of having to worry about the precision of his finger contact with respect to selection of links. Furthermore, the user can view hyperlink information and activate hyperlinks even if the hyperlinks are displayed at such a small size that the hyperlinks are illegible or barely legible.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising: at a portable electronic device with a touch screen display, displaying content on the touch screen display, wherein the content includes a plurality of links to additional content;
   detecting a contact by a finger with the touch screen display, wherein the contact includes an area of contact;
   determining links that at least partially overlap the area of contact;
   determining a first link in the determined links that at least partially overlap the area of contact;
   displaying text information associated with the first link over the displayed content, wherein the text information associated with the first link includes text information other than anchor text of the first link;
   ceasing to detect the contact; and,
   in response to ceasing to detect the contact:
   activating the determined first link when the contact ceases to be detected before predetermined activation criteria are met; and
   enabling the displayed text information associated with the first link to be selected to activate the first link when the contact ceases to be detected after the predetermined activation criteria are met.

2. The method of claim 1, further comprising determining a point within the area of contact, wherein the first link is a link that satisfies two or more predetermined proximity criteria with respect to proximity of the first link to the point, including a closest proximity criterion and a maximum proximity criterion.

3. The method of claim 2, wherein the closest proximity criterion is that the determined first link is the link in the determined links that at least partially overlap the area of contact that is closest to the centroid of the area of contact.

4. The method of claim 2, wherein the closest proximity criterion is that the determined first link is the link in the determined links that at least partially overlap the area of contact that is closest to the point.

5. The method of claim 2, wherein the closest proximity criterion is that the determined first link is the link in the determined links that at least partially overlap the area of contact that first intersects a predefined spiral path starting at the point.

6. The method of claim 5, wherein the spiral path is a clockwise spiral or a counterclockwise spiral.

7. The method of claim 5, wherein displayed content and the determined links that at least partially overlap the area of contact have associated coordinates, and the spiral path is defined with respect to the coordinates of the content.

8. The method of claim 5, wherein the maximum proximity criterion is that no link is determined if the spiral path reaches a predetermined radius without contacting a link in the determined links that at least partially overlap the area of contact.

9. The method of claim 8, wherein the predetermined radius is in the coordinates of the content.

10. The method of claim 2, wherein the maximum proximity criterion is that the determined first link is less than a predetermined distance from the point.

11. The method of claim 2, wherein the maximum proximity criterion is that the determined first link at least partially overlaps with the area of contact.

12. The method of claim 2, wherein the maximum proximity criterion is that the determined first link is entirely within the area of contact.

13. The method of claim 2, wherein the content on the touch screen display has an associated scale factor, and wherein the maximum proximity criterion is that the determined first link is located within a distance from the point that is determined in accordance with the scale factor.

14. The method of claim 1, wherein the content is a web page.

15. The method of claim 1, wherein the content is a document or email message.

16. The method of claim 1, wherein the predetermined activation criteria are met when a predetermined amount of time has elapsed.

17. The method of claim 1, wherein the predetermined activation criteria are met when the displayed text information associated with the first link has been displayed for more than a predetermined amount of time.

18. The method of claim 1, wherein the determined first link is activated with a tap gesture at a location on the touch screen display that corresponds to the displayed text information associated with the first link.

19. The method of claim 1, further comprising displaying additional content that corresponds to the activated link.

20. A graphical user interface on a portable electronic device with a touch screen display, a memory, and one or more processors to execute one or more programs stored in the memory, the graphical user interface comprising:
   content that includes a plurality of links to additional content;
   wherein, in response to detection of an area of contact of a finger with the touch screen display, links that at least partially overlap the area of contact are determined, and a first link in the determined links that at least partially overlap the area of contact is chosen;
   wherein text information associated with the first link is displayed over the content, wherein the text information associated with the first link includes text information other than anchor text of the first link; and
   wherein, in response to ceasing to detect the contact:
      the determined first link is activated when the contact ceases to be detected before first predetermined criteria are met; and
      the displayed text information associated with the first link is enabled to be selected to activate the first link when the contact ceases to be detected after the predetermined activation criteria are met.

21. A portable electronic device, comprising:
   a touch screen display;
   one or more processors;
   memory; and
   one or more programs, wherein the one or more programs are stored in the memory and configured to be executed by the one or more processors, the one or more programs including:
   instructions for displaying content on the touch screen display, wherein the content includes a plurality of links to additional content;
   instructions for detecting a contact by a finger with the touch screen display, wherein the contact includes an area of contact;
   instructions for determining links that at least partially overlap the area of contact;
   instructions for determining a first link in the determined links that at least partially overlap the area of contact:
   instructions for displaying text information associated with the first link over the displayed content, wherein the text information associated with the first link includes text information other than anchor text of the first link;
   instructions for ceasing to detect the contact; and,
   instructions for in response to ceasing to detect the contact:
      activating the determined first link when the contact ceases to be detected before predetermined activation criteria are met; and
      enabling the displayed text information associated with the first link to be selected to activate the first link when the contact ceases to be detected after the predetermined activation criteria are met.

22. A computer readable storage medium storing one or more programs, the one or more programs comprising instructions, which when executed by a portable electronic device with a touch screen display, cause the portable electronic device to:
   display content on the touch screen display, wherein the content includes a plurality of links to additional content;
   detect a contact by a finger with the touch screen display, wherein the contact includes an area of contact;
   determine links that at least partially overlap the area of contact;
   determine a first link in the determined links that at least partially overlap the area of contact:
   display text information associated with the first link over the displayed content, wherein the text information associated with the first link includes text information other than anchor text of the first link;
   cease to detect the contact; and,
   in response to ceasing to detect the contact:
      activate the determined first link when the contact ceases to be detected before predetermined activation criteria are met; and
      enable the displayed text information associated with the first link to be selected to activate the first link when the contact ceases to be detected after the predetermined activation criteria are met.

23. A portable electronic device with a touch screen display, comprising:
   means for displaying content on the touch screen display, wherein the content includes a plurality of links to additional content;
   means for detecting a contact by a finger with the touch screen display, wherein the contact includes an area of contact;
   means for determining links that at least partially overlap the area of contact:
   means for determining a first link in the determined links that at least partially overlap the area of contact:
   means for displaying text information associated with the first link over the displayed content, wherein the text information associated with the first link includes text information other than anchor text of the first link;
   means for ceasing to detect the contact; and,
   means responsive to ceasing to detect the contact, for:
      activating the determined first link when the contact ceases to be detected before predetermined activation criteria are met; and
      enabling the displayed text information associated with the first link to be selected to activate the first link when the contact ceases to be detected after the predetermined activation criteria are met.

* * * * *

UNITED STATES PATENT AND TRADEMARK OFFICE
CERTIFICATE OF CORRECTION

| | | |
|---|---|---|
| PATENT NO. | : 7,889,185 B2 | Page 1 of 1 |
| APPLICATION NO. | : 11/620646 | |
| DATED | : February 15, 2011 | |
| INVENTOR(S) | : Chris Blumenberg et al. | |

It is certified that error appears in the above-identified patent and that said Letters Patent is hereby corrected as shown below:

In column 8, line 17, delete "links" and insert -- links. --, therefor.

In column 14, line 46, in claim 23, delete "contact:" and insert -- contact; --, therefor.

Signed and Sealed this
Fifteenth Day of November, 2011

David J. Kappos
*Director of the United States Patent and Trademark Office*